June 21, 1960  J. MIHALYI  2,941,814
GOLF BAG AND SEAT CARRYING CART
Filed Oct. 9, 1958  3 Sheets-Sheet 2
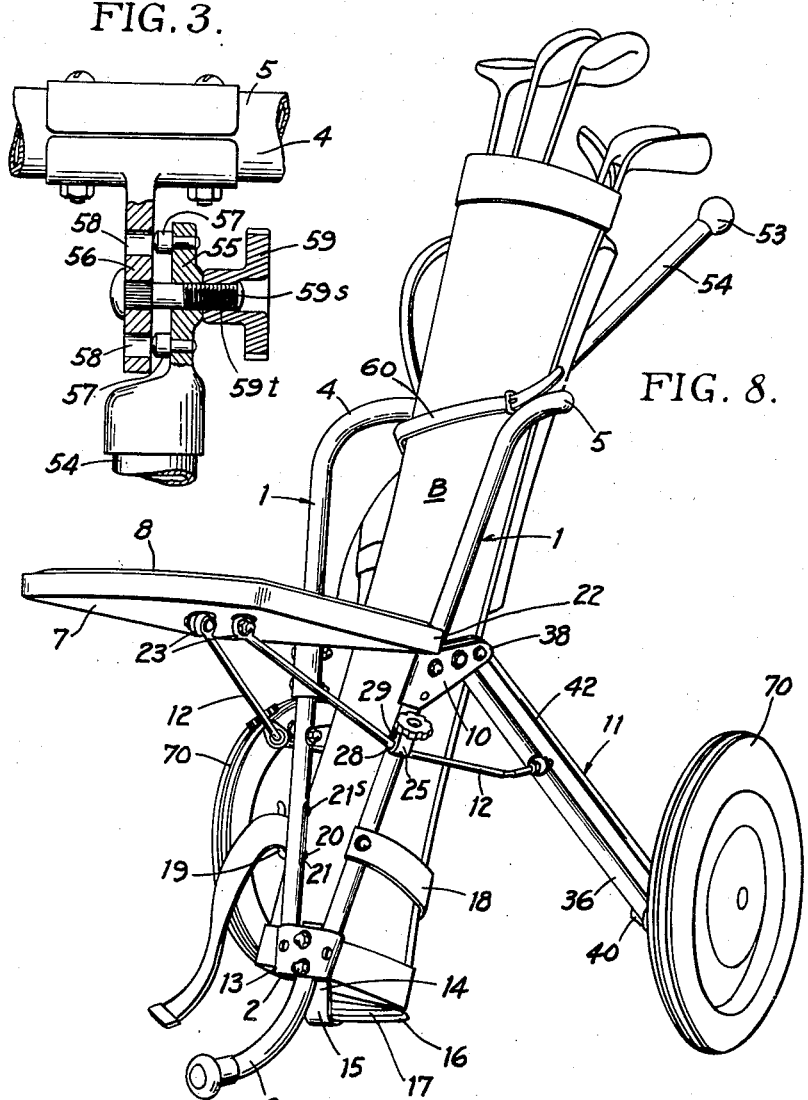
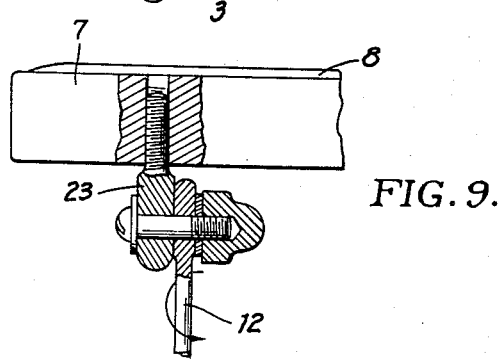
INVENTOR.
JOSEPH MIHALYI
BY
*Ronald H. Stewart*
ATTORNEY June 21, 1960 J. MIHALYI 2,941,814
GOLF BAG AND SEAT CARRYING CART
Filed Oct. 9, 1958 3 Sheets-Sheet 3

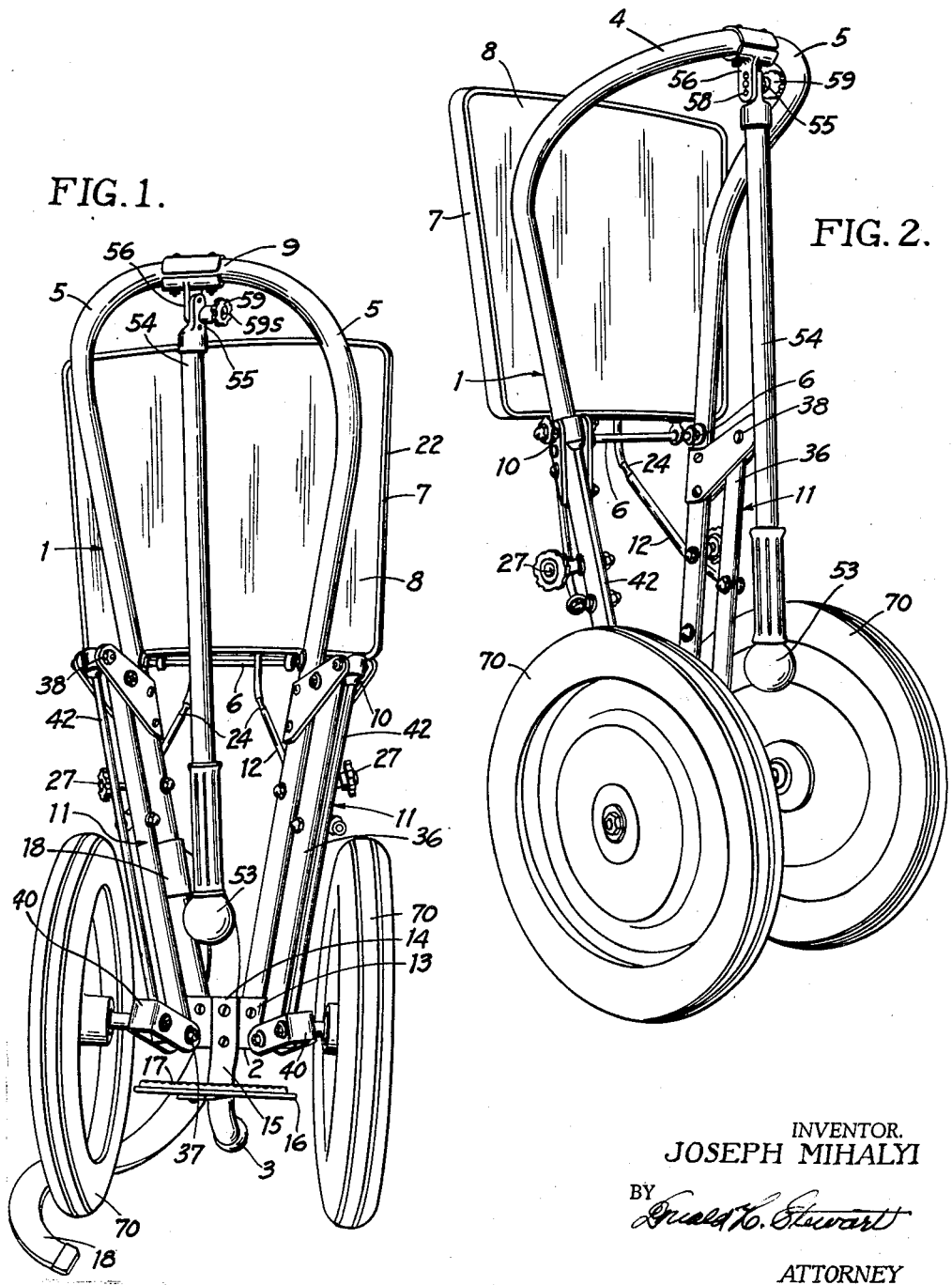

INVENTOR.
JOSEPH MIHALYI
BY Donald H. Stewart
ATTORNEY

United States Patent Office 2,941,814
Patented June 21, 1960

2,941,814
GOLF BAG AND SEAT CARRYING CART
Joseph Mihalyi, 76 Van Voorhis Ave., Rochester, N.Y.

Filed Oct. 9, 1958, Ser. No. 766,216

9 Claims. (Cl. 280—42)

This invention relates to a folding golf bag and seat cart. The golf bag carrier and the seat are so arranged that they fold compactly into a small space for storing, as in a golf room locker or car. The cart may support a golf bag and seat and may be wheeled about when in either a collapsed or erect position. The cart may be readily unfolded.

Golf bag carts are widely known, and carts with seats have also been suggested, but in any that I am aware of, the arrangements for the seats are of the nature of an attachment and are neither comfortable nor relatively foolproof. One reason for this is that in being an attachment the seats are usually off center and must be arranged to latch at least one wheel where the seat is used.

One of the objects of my invention is to provide a golf club carrier with a seat which folds compactly for storage. Another object is to provide a device of the nature described in which the seat may be used as a handle for operating the folding and unfolding movements of the device. Another object is to provide a device in which the seat is supported on a three-point suspension with the center of gravity so positioned that when in use a person using the seat is comfortably and solidly supported without danger of tipping. Another object is to provide a device in which the golf clubs may be securely held in an accessible position and properly positioned relative to the center of gravity. A still further object is to provide a device of the nature described in which the parts are arranged to either fold or unfold through a single movement of one of the parts and in which stops locate the parts in either an open or a closed position so they may be releasably fastened in the selected position. A still further object is to provide a folding golf bag and seat carrier which may be rolled on its wheels when in either a folded or unfolded position. Other objects will appear from the following description and may be suggested by the drawings, wherein like reference characters denote like parts throughout. These drawings show a preferred embodiment of my invention.

In the drawings:

Fig. 1 is a perspective view, taken from the rear, of a golf bag and seat carrying cart constructed in accordance with and illustrating a preferred form of my invention;

Fig. 2 is a view similar to Fig. 1 but with the view taken from the side and rear;

Fig. 3 is a sectional detail of a handle latch;

Fig. 8 is a perspective view from the front and side of the cart fully opened and with a golf bag in place;

Fig. 9 is a fragmentary detail, partially in section, of a support for a guide rod.

Figure 4:
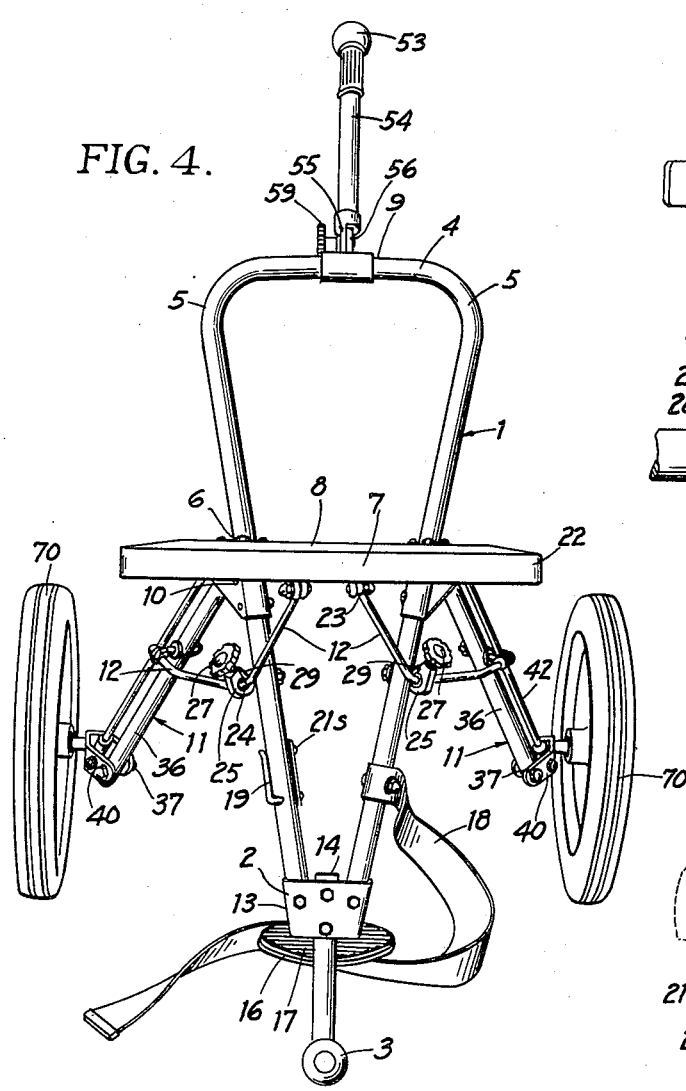
Fig. 4 is a front perspective view of the cart shown in the preceding figures with the parts shown in an unfolded or erect position.

In the preferred embodiment of my invention a single frame provides a support for a hinged seat, wheels and guiding and latching bars, all movable to quickly fold or unfold to and from an operative position a resting foot supporting these parts in an operative or inoperative position. When folded, the cart may readily go in a standard size locker or a car. When unfolded, the golf club bag is held upright and the seat is positioned for use and retained rigidly in an operative position. It should also be noted that the cart wheels remain substantially parallel at all times and the cart can be wheeled in both an open and a folded position. The center of gravity of the bag and seat carrier is such that the seat and golf bag have no tendency to tip or move, even though the wheels are not locked against rotation.

More specifically, the frame 1 comprises a diverging pair of arms connected at the bottom 2 to a foot 3. The upper portion 4 may be formed by bending the frame rearwardly and around an arc at 5 to form a clearance for a golf bag. Since tubing such as aluminum or magnesium is strong and light, I prefer to use such tubing for the frame, although obviously different forms of metal may be used as desired.

Hinged at 6 to the frame 1 is a seat 7 with a suitable cushion or the like 8. Hinged to the middle 9 of the arc 5 is a handle 54 movable from the folded position of Fig. 2 to an unfolded position as in Fig. 8. Also hinged at 10 to the frame 1 near the seat 7 thereof are parallel linkages shown broadly at 11, and thin guide rods 12, all as will be hereinafter more fully described.

The foot 3 is riveted to a bracket 13 which carries the upper end 14 of a metal strap 15, Fig. 8, on which there is a bottom shelf 16. This shelf supports the bottom of a golf bag. The shelf 16 may have a rubber covering 17.

Figure 6:
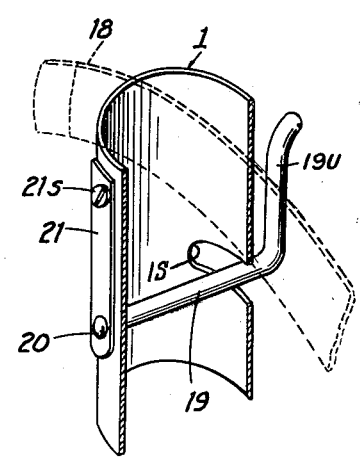
Fig. 6 is a fragmentary detail, partially in section and partially in perspective, of a strap latch.
Figure 7:
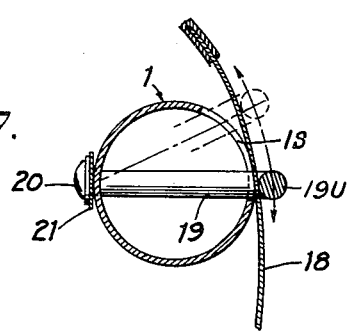
Fig. 7 is a view similar to Fig. 6 but with the sectional view being taken transversely of the frame member.

Just above the shelf 16 is a strap 18 for holding the bottom of the bag. This strap may be engaged by a latching device (shown in detail in Figs. 6 and 7), which may comprise an L-shaped rod 19, one end 20 of which is carried on a leaf spring 21. The leaf spring 21 may be held to frame 1 by any suitable manner as by a screw 21s. End 20 of member 19 passes through an aperture (not shown) in frame 1 and the other end of member 19 passes through a slot 1S with the upturned portion 19U in close proximity to the frame member 1, see Figs. 6 and 7. Leaf spring 21 normally maintains rod 19 as shown in Fig. 7 in a position in which it extends diametrically across frame member 1 and adjacent one end of slot 1S and in which position portion 19U is practically in contact with frame member 1. On movement of rod 19 in a counterclockwise direction, see Fig. 7, portion 19U moves away from frame member 1 due to its circular cross section and the mounting of rod 19. In such a position strap 18 can be inserted between portion 19U and frame member 1 and pulled taut. Upon releasing rod 19, spring 20 moves portion 19U into engagement with the strap to clamp it therebetween. Since the strap 18 is of greater thickness than the spacing of separation of member 1 or portion 19U when in a normal position, spring 20 causes the strap to be snubbed between member 1 and portion 19U. It can be readily appreciated that any force exerted on the strap which tends to draw it downward, as viewed in Fig. 7, will increase the snubbing action. To release strap 18, it need only be pulled in a slightly forward and upward direction to be completely released from between frame member 1 and portion 19U.

Figure 5:
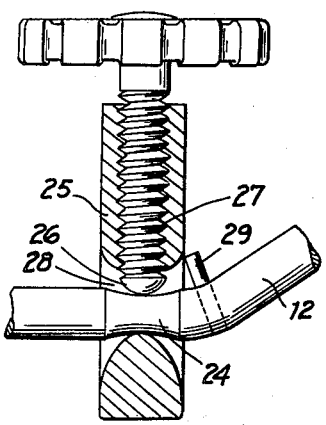
Fig. 5 is a fragmentary detail, partially in section, of a guide bar latching device.

The seat 7 is hinged to frame 1 at 6. The location of hinge 6, through the seat frame 22 resting against frame 1 limits the downward movement of the seat. A pair of smaller guide rods 12, as best shown in Figs. 4 and 8, also control movement of the seat 7. It will be noted that each guide rod 12 is pivoted to the seat at 23, see Figs. 1 and 9, and comprises a bent rod having a section of reduced diameter at 24. This is for readily engaging the round end 26 of the latching screw 27 passing into the recess 28, as shown in detail in Fig. 5. Each guide rod 12 also includes a stop pin 29 which engages a frame member 1 when swung to an open position. Each guide rod 12 is mounted on a swivel hinge 23 to the seat and so may rotate a few degrees about this hinge, as well as turn thereon. This facilitates smooth opening and closing movements. When positioned and latched by the latching screws 27, the seat will support a very heavy weight without difficulty.

The guide rods also have another important function in controlling the swinging movements of the parallel linkages shown broadly at 11. Each linkage, best shown in Figs. 4 and 8, comprises an inner tube 36 hinged at 37 to a bracket 40 which carrier a wheel 70. There is also an outer rod or tube 42, Fig. 8, pivoted to bracket 38 at one end and to the bracket 40 at the other end. The structure on the opposite side is the same, and the same reference numerals are applied thereto. Since each parallel linkage 11 is guided through the latching device recesses 28 (which are merely beveled apertures), the linkages move the wheels simultaneously to and from each other according to the movement of the seat 7. The locking screw 27, Fig. 5, can be moved into recess 24 by a turn of knob 30. Recess 24 is quickly positioned by pin 29 striking the bracket 40. The linkages move in substantial parallelism throughout their range of movement. This has a number of advantages. First, the seat when opened and ready for use is always supported by the frame on which the wheels are separated to their full extent and the three-point support is automatically obtained. Second, the wheels are simultaneously folded toward each other when the seat folds up. Thus no additional folding operations are necessary except for the handle. The wheels are always parallel and may be used to wheel the carriage in both an open and a closed or folded position.

The handle 53 may be of any desirable shape and is on the end of a tube or rod 54. Rod 54 is attached to hinge section 55, Fig. 3, coacting with a second hinged section 56 carried by the curved frame at its rearmost arc 5. One hinge section has a pair of pins 57 and the other a pair of mating holes 58, so that by turning the handle until the pins and holes mate a short turn of knob 59 holds the handle in an operative position. Usually I prefer to hold the parts in an inoperative position by friction only by a slight turn of knob 59, but this latch too may be made a locating one by providing additional holes to mate with the pins. The knob 59 is threaded at 59t to hinge section 56. Screw 59s is headed over to prevent knob 59 from coming off.

Near the top of the frame 1 there is a second bag-securing strap 60. This may have the same type latch 19 as strap 18, or it may be the customary upper strap (on most golf bags). No strap is actually necessary, as the bag lies behind seat 7 and in the rearwardly curved arc 5 of frame 1. Thus the tubes 1 of the frame and the bag B form a comfortable back for the seat 7.

In the preferred embodiment of my invention the operation of my golf cart seat is fast, sure, and foolproof. With parts in a folded position, Figs. 1 and 2, the latch screws 27 are released, and with the wheels 70 raised and the foot 3 on the floor, or sod, the seat 7 is moved down. Through the parallel linkages 11 the guide rods 12 and the seat 7 all swing together to a fully open position. The latch screws 27 catch with the reduced portions 24 of the guide rods beneath the latch screws, and the screws may be turned to fasten the parts rigidly in an operative position.

The seat is properly positioned between the two wheels 70 and the foot 3, and the weight of a person sitting thereon is adequately supported. The single foot 3 presses into the sod or upon any other surface and prevents slipping, so the wheels do not turn, even though they need not be locked. If the ground is very soft, the lower shelf 16 tends to prevent too great penetration of the foot 3 to disturb adequate balance of the seat. The handle 53 may be released at its hinge 55, 56 and turned to engage pins and holes and then may be fastened by a turn of the knob 59. To fold, resting the cart on the foot 3 and raising the wheels 70, by moving the seat 7, the folding parts move together with the exception of foot 3 and handle 53. Handle 53 may be separately folded when the knob 59 is released. The golf bag usually remains in place on the cart, but may be removed if desired.

The above-described folding golf bag and seat cart is a preferred form of my invention and one which satisfies the objects of my invention. The cart wheels mounted on parallelogram linkages always move parallel to each other. The design is such that the cart may be wheeled when either in a folded position or in an erect position. The seat can only be used when the cart is in an erect position.

Other forms of my invention may readily occur to those skilled in the art and I consider as within the scope of my invention all such forms as may come within the scope of the appended claims.

I claim:

1. A collapsible golf bag and seat carrying cart comprising, in combination, a rigid frame member including a rearwardly extending top and back with downwardly extending spaced legs terminating adjacent to each other at the bottom of the frame, a foot carried by the bottom, a seat pivotally attached to the frame between the top and bottom thereof, and movable thereon between a collapsed and an open position, wheels, a parallelogram linkage one for each wheel, pivotal connections carried by the linkages on which the wheels may turn, a mount for attaching each parallelogram linkage to the frame, a guide rod pivotally attached to the seat and to a link of one parallel linkage, a slideway on the frame through which a guide rod may slide and means on the slideway for latching the rod in a predetermined position whereby the wheels and seat may be simultaneously moved by the guide rods from a collapsed position in which the wheels lie close together and the seat is folded against the frame to an open position in which the wheels are separated and the seat extends from the frame in position for use, and a lower shelf adjacent to the foot for supporting a golf bag thereon with the bag behind the seat and lying against the rearwardly extending top and back.

2. The collapsible golf bag and seat carrying cart defined in claim 1, characterized in that a handle is mounted on the top of the rigid frame member by means of a hinge.

3. The collapsible golf bag and seat carrying cart defined in claim 1, characterized in that the frame, seat, wheels and connecting linkages are arranged about a golf bag positioned on the lower shelf in the collapsed or open positions, and that the connecting linkages are slidable on the frame and attachable thereto by manually operated clamping devices, and in that the wheels and the foot may support the cart in an upright position when the cart is collapsed or open, the clamping devices holding the parts in said positions.

4. A collapsible golf bag and seat carrying cart comprising, in combination, a frame having a rearwardly extending top with arms extending downwardly and toward each other, a foot carried by the bottom of the frame, a seat hingedly supported by the frame and foldable to and from a collapsed position lying against the frame, wheels, parallelogram connecting links between each wheel and the frame, the links having pivotal connections with the frame and wheels whereby substantially parallel movement may be obtained in moving between an open spaced position and a collapsed position in which the wheels lie close together, connecting rods pivotally connected to the seat and to the parallelogram linkages whereby the wheels may be moved together by moving the seat, a slidable connection between the frame and the connecting rods with means thereon for holding the parts in a set position.

5. The collapsible golf bag and seat carrying cart defined in claim 4 characterized in that when the frame, foot and wheels are in an open position they are spaced apart and the seat is positioned with its center of gravity lying within the triangle formed by the wheels and foot.

6. The collapsible golf bag and seat carrying cart defined in claim 4 characterized in that when the frame, foot and wheels are in an open position they are spaced apart and the seat is positioned with its center of gravity lying within the triangle formed by the wheels and foot, and in that a lower shelf is carried by the frame near the foot to support a golf bag which may lie in the rearwardly extending top and behind the seat.

7. The collapsible golf bag and seat carrying cart defined in claim 4 characterized in that the connecting rods include areas of reduced size to move into the slidable connections between the rods and the frame to form recesses which may be readily engaged by latching devices carried by the frame.

8. The collapsible golf bag and seat carrying cart defined in claim 4 characterized in that the connecting rods include areas of reduced size to move into the slidable connections between the rods and the frame to form recesses which may be readily engaged by latching devices carried by the frame and further characterized in that the connecting rods include stop members to engage parts of the frame whereby the parts may be positioned for latching as the parts move to an operative position.

9. The collapsible golf bag and seat carrying cart defined in claim 4 characterized in that the wheels and foot form a triangle when the cart is in an open and a closed position, and that the center of gravity of the cart and a golf bag is such that it lies within the triangle formed by the wheels and foot and may support the golf bag when the cart is collapsed as well as when the cart is open.

References Cited in the file of this patent

UNITED STATES PATENTS

| | | |
|---|---|---|
| 2,380,437 | Homrighausen | July 31, 1945 |
| 2,438,078 | Sutphen | Mar. 16, 1948 |
| 2,599,928 | Lyons | June 10, 1952 |
| 2,629,429 | Baumfeld | Feb. 24, 1953 |